Figure 1:
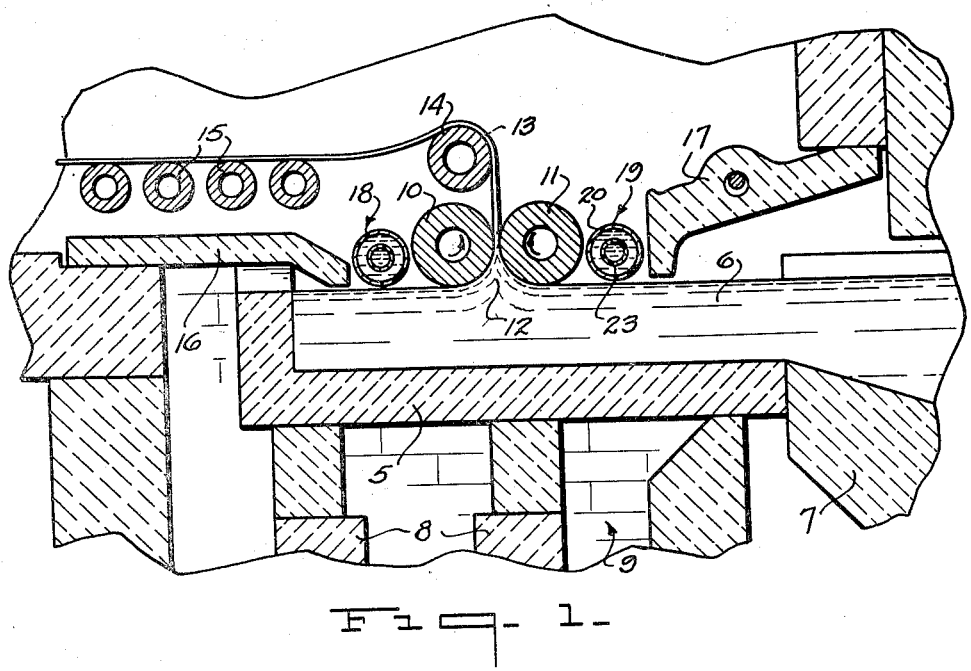

April 3, 1934.  J. L. DRAKE  1,953,341

SHEET GLASS COOLER AND PROCESS OF ABSORBING HEAT

Filed Sept. 15, 1932

Inventor

JOHN L. DRAKE.

By Frank Fraser,

Attorney

Patented Apr. 3, 1934

1,953,341

UNITED STATES PATENT OFFICE 1,953,341

SHEET GLASS COOLER AND PROCESS OF ABSORBING HEAT

John L. Drake, Toledo, Ohio, assignor to Libbey-Owens-Ford Glass Company, Toledo, Ohio, a corporation of Ohio Application September 15, 1932, Serial No. 633,302

6 Claims. (Cl. 49—17)

This invention relates to improvements in sheet or plate glass apparatus and has more particular reference to a novel form of cooler for association therewith and to a process of absorbing heat.

In certain processes for continuously forming sheet glass from a pool of molten glass, it is customary to position a pair of coolers at opposite sides of the sheet and relatively close to the surface of the molten pool from which the sheet is formed to absorb sufficient heat therefrom to permit the formation of a good sheet of glass.

Certain types of these coolers are so constructed that there is a tendency for moisture to condense upon the outer surface of the walls thereof, thereby causing the cooler to sweat. This sweating of the cooler not only causes it to rust or corrode, but, in addition, the outer surfaces of the cooler tend to flake off into the molten glass, resulting in defects in the finished sheet. Again, in other coolers the condensation of moisture forms a film upon the outer surface of the walls thereof so that it becomes necessary that these coolers be frequently cleaned in order to remove this film. Aside from the above, in some forms of coolers, there is provided an outer casing within which is arranged a longitudinally extending liquid supply pipe having a relatively large number of small openings or apertures therein through which the cooling liquid is discharged into said casing in the form of a plurality of streams or jets. The discharging of the cooling liquid into the casing in this manner, however, causes an ununiform or spotty cooling action which, when transmitted to the glass, is very apt to result in the formation of waves in the sheet being produced.

An important object of the present invention is to overcome the objectionable features noted above by the provision of a novel form of cooler so constructed as to eliminate the condensation of moisture upon the outer surface of the walls thereof and thereby prevent sweating of said cooler.

Another object of the invention is the provision of a cooler embodying an outer casing and means for circulating a cooling liquid therethrough in such a manner that a smooth uniform flow of liquid through the cooler will be had whereby to effect an even and uniform cooling action upon the molten glass.

A further object of the invention is the provision of a cooler including a hollow and preferably cylindrical casing having means arranged therein for circulating a cooling liquid such as water therethrough in a manner to rapidly absorb heat from the casing without cooling the outer surface thereof sufficient to cause sweating.

Some of the other objects of the invention are to provide a cooler having an increased cooling capacity; the elimination of dead or stagnant corners within the cooler whereby the said cooler is substantially self-cleaning and less subject to corrosion; a more uniform and equal temperature regulating capacity at all points throughout the length of the cooler, and one which will have a smoother and gradually increasing cooling effect upon the molten glass passing therebeneath, and which will therefore temper the glass to such an extent that any abrupt or sudden chilling thereof will be avoided.

Other objects and advantages of the invention will become more apparent during the course of the following description when taken in connection with the accompanying drawing.

Figure 2:
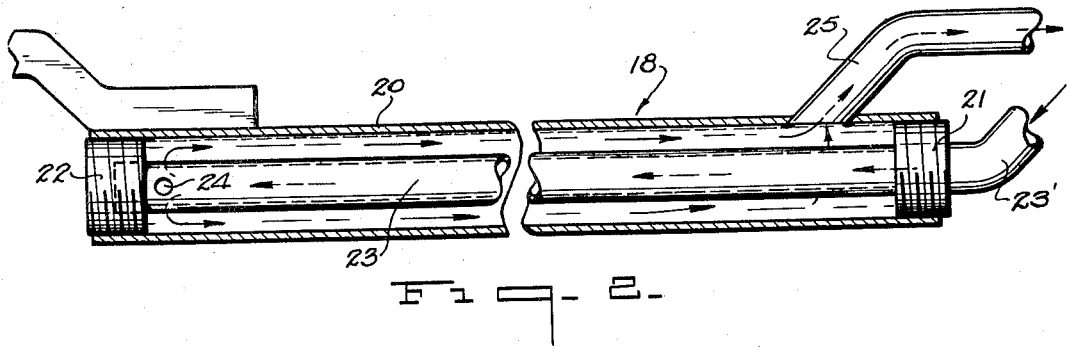

In the drawing forming a part of this application and wherein like numerals are employed to designate like parts throughout the same, Fig. 1 is a vertical longitudinal section through one type of sheet glass forming apparatus, showing a pair of coolers constructed in accordance with the present invention in association therewith, and Fig. 2 is a longitudinal section through one of the improved coolers.

Although it is to be expressly understood that the coolers of the present invention are not limited to use in connection with any particular type of sheet glass forming apparatus, yet they have been illustrated in the drawing by way of example in association with a machine for drawing a relatively heavy body of molten glass upwardly from a bath or pool of molten glass and rolling it to a sheet of substantially predetermined and uniform thickness. This, however, is merely illustrative of one form of sheet glass apparatus with which the improved coolers may be used.

The sheet glass forming apparatus herein disclosed includes a relatively shallow working receptacle 5 containing a mass of molten glass 6 supplied thereto either continuously or substantially continuously from any suitable type of glass melting furnace 7. The working receptacle 5 may be supported upon stools 8 within a heating chamber 9 heated in any desired manner.

Positioned transversely above the receptacle 5 is a pair of horizontally disposed sheet forming rolls 10 and 11 respectively which are adapted to be positively driven in such a manner as to draw a relatively heavy body of molten glass 12 upwardly from said mass and roll it to a sheet 13 of substantially predetermined and uniform thickness. This sheet is continued upwardly for a relatively short distance and then deflected into the horizontal plane about a bending roll 14, the said sheet being supported in its horizontal run upon a plurality of horizontally aligned conveyor rolls 15, and carried forwardly into and through an annealing leer (not shown). If desired, there may be arranged above the closed end of receptacle 5 a relatively flat lip tile 16, while a second lip tile 17 may be suspended above the molten glass 6 in advance of roll 11.

Positioned horizontally with respect to the forming rolls 10 and 11 and outwardly thereof are the improved coolers 18 and 19 respectively which serve to protect the forming rolls and sheet from heated air currents escaping from the furnace 7 and heating chamber 9 and, at the same time, aid in absorbing sufficient heat from the molten glass 6 passing thereunder to give it the proper viscosity to permit it to be drawn upwardly by said forming rolls.

The improved coolers 18 and 19 are identical in construction so that a detailed description of only one of them is thought to be necessary. Thus, each cooler comprises a hollow cylindrical casing 20 preferably of a uniform diameter throughout its entire length and closed at its opposite ends by the plug members 21 and 22 respectively. Extending longitudinally within the casing 20 throughout substantially the entire length thereof and arranged concentric with respect thereto is a liquid supply pipe 23. This pipe 23 passes through the plug member 21 and projects beyond the casing 20 as shown at 23', while the opposite end of said pipe is supported within the plug member 22 which also serves to close the adjacent end of the said pipe. The pipe 23 is imperforate throughout its length except for the provision of a plurality of openings 24 formed therein at a point closely adjacent the plug member 22. Communicating with and leading from the casing 20 at the end thereof adjacent the plug member 21 is an outlet conduit 25.

In the operation of the cooler above described, the cooling liquid, which is usually water, is adapted to be introduced into the cooler through the projecting end 23' of pipe 23 and to subsequently pass therefrom through the outlet 25 in casing 20. Due to the fact that the pipe 23 extends throughout substantially the entire length of casing 20, and also due to the positioning of openings 24 closely adjacent the plug member 22, it will be seen that the cooling liquid will be conducted by the pipe 23 in one direction throughout substantially the entire length of the cooler before being discharged from said pipe through the openings 24 into casing 20. Also, as a result of the positioning of the outlet 25 adjacent the end of the cooler through which the cooling liquid is initially introduced, the said cooling liquid, after passing from pipe 23 into casing 20, must flow in the opposite direction and throughout substantially the entire length of the cooler before passing outwardly of the casing through conduit 25. Consequently, the cooling liquid is caused to flow smoothly and uniformly through the cooler from one end thereof to the other, said liquid flowing first in one direction through the pipe 23 and then in the opposite direction through casing 20. In this manner, an even and uniform cooling action upon the molten glass will be had.

The cooling liquid is caused to pass through the cooler at a relatively high velocity and, as the said liquid flows through the pipe 23, it becomes sufficiently hot so that the temperature thereof is such that upon passing of the liquid in the opposite direction through casing 20, it will tend to absorb heat rapidly from the casing without cooling the outer surface thereof to a point where moisture will condense thereon. In other words, the velocity and temperature of the cooling liquid are so related that the liquid, upon passage thereof through casing 20, will rapidly absorb heat while, at the same time, being sufficiently hot so that the outer surface of the casing will be maintained above the point where moisture will condense thereon. By preventing condensation of moisture upon the casing, sweating of the outer surface thereof, with the objectionable features incident thereto, will be avoided. The cooler herein provided will have a maximum cooling efficiency and a more uniform and accurate temperature regulating capacity at all points throughout the length thereof. Also, this form of cooler has no dead corners in which deposits from the cooling liquid may accumulate so that it will be substantially self-cleaning and less subject to corrosion.

When the improved type of cooler above described is positioned above a mass of molten glass in the manner illustrated in the drawing, it will be readily apparent that, due to the fact that the said cooler is circular in cross section, it will have a smoother and gradually increasing cooling effect upon the molten glass passing therebeneath so that any abrupt or sudden chilling of the glass, such as sometimes occurs when a cooler having a flat bottom of substantial width is employed, will be avoided. For instance, it will be seen that the mass of molten glass 6 passing from right to left in Fig. 1 and beneath the cooler 19 will be subjected to a gradually increasing cooling action as the glass approaches the lowermost point of the cooler, or in other words, that point closest to the upper surface of the mass of molten glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for producing sheet glass, a receptacle containing a mass of molten glass, means for forming a sheet from said mass of glass and passing it upwardly therefrom, and a horizontally disposed cooler arranged transversely above the mass of molten glass at one side of the sheet for absorbing heat from said mass, said cooler comprising a hollow cylindrical casing closed at the opposite ends thereof, and a pipe extending longitudinally within the casing for conducting a cooling liquid in one direction throughout substantially the entire length of said casing, said pipe having openings for discharging the cooling liquid into the casing at the end thereof remote from the end through which the cooling liquid enters, said casing having an outlet adjacent the end of the cooler through which the cooling liquid initially enters so that the said cooling liquid, after being discharged into the casing, must flow in the opposite direction and throughout substantially the entire length of said casing before passing therefrom.

2. In apparatus for producing sheet glass, a receptacle containing a mass of molten glass, means for forming a sheet from said mass of glass and passing it upwardly therefrom, and a horizontally disposed cooler arranged transversely above the mass of molten glass at one side of the sheet for absorbing heat from said mass said cooler comprising a hollow cylindrical casing closed at the opposite ends thereof, a pipe arranged within said casing concentric with respect thereto and extending substantially the entire length thereof, said pipe being adapted to conduct a cooling liquid in one direction throughout substantially the entire length of said casing and being provided with a plurality of openings adjacent one end thereof only for discharging the cooling liquid into the casing at the end thereof remote from the end through which the cooling liquid enters, and an outlet in the casing adjacent the end of the cooler through which the cooling liquid initially enters so that the said cooling liquid, after being discharged into said casing, must flow in the opposite direction and throughout substantially the entire length of said casing before passing therefrom.

3. In apparatus for producing sheet glass, a receptacle containing a mass of molten glass, means for forming a sheet from said mass of glass and passing it upwardly therefrom, and a horizontally disposed cooler arranged transversely above the mass of molten glass at one side of the sheet for absorbing heat from said mass, said cooler comprising a hollow cylindrical casing, plug members closing the opposite ends thereof, a pipe arranged within said casing concentric with respect thereto and extending substantially the entire length thereof, one end of said pipe projecting beyond the adjacent end of said casing and extending through the respective plug member while the opposite end of the pipe is closed and supported by the plug member at the opposite end of the casing, said pipe being adapted to conduct a cooling liquid in one direction throughout substantially the entire length of said casing and being provided with a plurality of openings adjacent the closed end thereof only for discharging the cooling liquid into the casing at the end thereof remote from the end through which the said cooling liquid enters, and an outlet in the casing adjacent the end of the cooler through which the cooling liquid initially enters so that the said cooling liquid, after being discharged into the casing, must flow in the opposite direction throughout substantially the entire length of said casing before passing therefrom.

4. In the manufacture of sheet glass wherein molten glass is continuously flowed from a tank furnace into a relatively shallow working receptacle and drawn upwardly therefrom in sheet form, the process of absorbing heat from the mass of molten glass within said receptacle or from the newly formed glass sheet, which consists in arranging a metallic casing adjacent thereto but out of contact therewith, in flowing a stream of cooling liquid circular in cross section in one direction throughout substantially the entire length of said casing and out of contact with the outer side walls thereof, in then passing the cooling liquid into the casing only at a point relatively closely adjacent the end thereof remote from the end through which the cooling liquid is initially introduced, and in then causing said cooling liquid to flow in the opposite direction throughout substantially the entire length of the casing in the form of a second stream annular in cross section in contact with the outer side walls of said casing and in surrounding relation to but spaced from the first stream of cooling liquid.

5. In apparatus for producing sheet glass, a receptacle containing a mass of molten glass, a pair of rotatable forming rolls positioned transversely above the receptacle and adapted to draw a relatively heavy body of glass upwardly from said mass and reduce it to sheet form, a third roll arranged above the forming rolls and about which the sheet is deflected from the vertical to the horizontal plane, and a horizontally disposed cooler arranged transversely above the mass of molten glass adjacent one of said forming rolls for absorbing heat from said mass, said cooler comprising a hollow cylindrical casing closed at the opposite ends thereof, a pipe arranged within said casing concentric with respect thereto and extending substantially the entire length thereof, said pipe being adapted to conduct a cooling liquid in one direction throughout substantially the entire length of said casing and being provided with a plurality of openings adjacent one end thereof only for discharging the cooling liquid into the casing at the end thereof remote from the end through which the cooling liquid enters, and an outlet in the casing adjacent the end of the cooler through which the cooling liquid initially enters so that the said cooling liquid, after being discharged into said casing, must flow in the opposite direction and throughout substantially the entire length of said casing before passing therefrom.

6. The process of producing sheet glass, which consists in establishing a mass of molten glass in a working receptacle, drawing a relatively heavy body of glass upwardly from said mass and rolling it to a sheet of substantially predetermined and uniform thickness, in passing the said sheet upwardly for a relatively short distance and then deflecting it from the vertical into the horizontal plane, and in absorbing heat from the mass of molten glass passing to the forming rolls by arranging a metallic casing adjacent thereto but out of contact therewith, in flowing a stream of cooling liquid circular in cross section in one direction throughout substantially the entire length of said casing and out of contact with the outer side walls thereof, in then passing the cooling liquid into the casing only at a point relatively closely adjacent the end thereof remote from the end through which the cooling liquid is initially introduced, and in then causing said cooling liquid to flow in the opposite direction throughout substantially the entire length of the casing in the form of a second stream annular in cross section in contact with the outer side walls of said casing and in surrounding relation to but spaced from the first stream of cooling liquid.

JOHN L. DRAKE.